UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLUE MONOAZO DYE.

SPECIFICATION forming part of Letters Patent No. 654,064, dated July 17, 1900.

Application filed April 3, 1900. Serial No. 11,359. (No specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria, Empire of Germany, have invented new and useful Improvements in Monoazo Dyestuffs from Nitro-amidophenolsulfo-Acid, of which the following is a specification.

The present invention relates to the manufacture of a new monoazo dye from nitro-amido-phenol-sulfoacid ($NO_2$:$OH$:$NH_2$:$SO_3H$ = 1.2.3.5) and 1.5.7 amido-naphtol-sulfoacid.

The new coloring-matter is a dark powder soluble in water with a blue-violet color, which changes on the addition of hydrochloric acid to light red. It dyes unmordanted wool blue shades, which on treatment with chromic acid, chromates, or chromium salts become greener and blacker and then possess a most excellent degree of fastness to light, milling, washing, and other influences.

The following example will serve to further illustrate the nature of this invention and how it may be carried into practical effect. The parts are by weight.

Example: Dissolve about two hundred and thirty-four (234) parts of ortho-nitro-ortho-amido-phenol-para-sulfoacid in about five thousand (5,000) parts of water, and diazotize at the ordinary temperature by the addition of one hundred and fifty (150) parts of hydrochloric acid (containing about thirty per cent. HCl) and a solution of sixty-nine (69) parts of sodium nitrite. Prepare a solution of about two hundred and forty parts of 1.5.7 amido-naphtol-sulfoacid in about five thousand (5,000) parts of water, to which an excess of soda has been added. Into this solution run in the diazo solution while stirring. In a short time a portion of the coloring-matter separates out in the form of greenish glittering crystals. Add common salt to complete the precipitation, filter, press, and dry.

Now what I claim is—

As a new product the monoazo dyestuff from nitro-amido-phenol-sulfoacid ($NO_2$:$OH$:$NH_2$:$SO_3H$=1.2.3.5) and 1.5.7 amido-naphtol-sulfoacid, which can be obtained by diazotizing the specified nitro-amido-phenol-sulfoacid and combining the diazo compound with 1.5.7 amido-naphtol-sulfoacid in alkaline solution and is a dark powder, soluble in water with a blue-violet color, changing on the addition of hydrochloric acid to a light red, and which dyes unmordanted wool blue shades, which on treatment with potassium-bichromate solution becomes greener and blacker substantially as described.

In testimony whereof I hereunto set my hand in the presence of two subscribing witnesses.

PAUL JULIUS.

Witnesses:
ALEXANDER ALLBRECHT,
JOHN L. HEINKE.